United States Patent
Oshima et al.

(10) Patent No.: US 8,844,668 B2
(45) Date of Patent: Sep. 30, 2014

(54) COMBINED HEAT SHIELD AND WIRE-HOLDING STRUCTURE FOR A SADDLE-TYPE VEHICLE

(75) Inventors: Tadashi Oshima, Saitama (JP); Masayuki Hojo, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 223 days.

(21) Appl. No.: 12/378,226

(22) Filed: Feb. 12, 2009

(65) Prior Publication Data
US 2009/0242312 A1 Oct. 1, 2009

(30) Foreign Application Priority Data
Mar. 27, 2008 (JP) ................................ 2008-082963

(51) Int. Cl.
- *B62K 5/01* (2013.01)
- *B62J 6/18* (2006.01)
- *B62J 23/00* (2006.01)
- *B62J 35/00* (2006.01)

(52) U.S. Cl.
CPC ... *B62J 6/18* (2013.01); *B62K 5/01* (2013.01); *B62J 35/00* (2013.01); *B62J 23/00* (2013.01); *Y10S 180/908* (2013.01)
USPC ............ 180/312; 180/219; 180/908; 280/835

(58) Field of Classification Search
USPC ............ 180/312, 68.1, 68.2, 68.4, 68.6, 219; 280/833, 835; 361/826; 439/445, 211, 439/207, 210; 174/95
See application file for complete search history.

(56) References Cited

U.S. PATENT DOCUMENTS

| | | | | |
|---|---|---|---|---|
| 5,692,578 A | * | 12/1997 | Miyakawa et al. | 180/68.3 |
| 6,268,566 B1 | | 7/2001 | Takiguchi et al. | |
| 6,920,949 B2 | * | 7/2005 | Matsuura et al. | 180/68.2 |
| 7,370,625 B2 | * | 5/2008 | Hanafusa | 123/198 R |
| 7,592,546 B2 | * | 9/2009 | Johansson | 174/95 |
| 7,604,677 B2 | * | 10/2009 | Tsuruta et al. | 55/385.3 |
| 7,708,099 B2 | * | 5/2010 | Oodachi et al. | 180/229 |
| 7,910,829 B2 | * | 3/2011 | Sculler et al. | 174/72 A |
| 2006/0288975 A1 | * | 12/2006 | Hanafusa | 123/195 C |
| 2008/0011512 A1 | * | 1/2008 | Burns | 174/504 |

FOREIGN PATENT DOCUMENTS

| | | |
|---|---|---|
| JP | 59-081682 U | 6/1984 |
| JP | 62-033983 U | 2/1987 |
| JP | 11-178174 A | 7/1999 |
| JP | 2006-123656 | 5/2006 |

* cited by examiner

*Primary Examiner* — Anne Marie Boehler
(74) *Attorney, Agent, or Firm* — Carrier Blackman & Associates, P.C.; William D. Blackman; Anne G. Sabourin

(57) ABSTRACT

A combined heat shield and wire-holding structure for a saddle-type vehicle, where the vehicle includes a pair of right and left frame sections extending in a vehicle longitudinal direction, and a fuel tank disposed above the vehicle body frame sections. The combined heat shield and wire-holding structure comprises a heat shield, which is disposed below the fuel tank and which extends between the right and left body frame sections. The combined heat shield and wire-holding structure includes a wire-holding portion which extends in the vehicle longitudinal direction outside of the vehicle body frame, and the wire-holding portion holds a wiring harness routed through an inside portion of the vehicle.

20 Claims, 6 Drawing Sheets

US 8,844,668 B2

COMBINED HEAT SHIELD AND WIRE-HOLDING STRUCTURE FOR A SADDLE-TYPE VEHICLE

CROSS-REFERENCE TO RELATED APPLICATIONS

The present invention claims priority under 35 USC 119 based on Japanese patent application No. 2008-082963, filed on Mar. 27, 2008. The entire subject matter of this priority document, including specification claims and drawings, is incorporated by reference herein.

BACKGROUND OF THE INVENTION

1. Technical Field of the Invention

The present invention relates to a wire-holding structure for a saddle-type vehicle which is capable of supporting a wiring harness routed through an inside portion of the vehicle. More particularly, the present invention relates to a combined heat shield and wire-holding structure which is configured to install a wiring harness at a location between a frame section and a vehicle body cover in a saddle-type vehicle.

2. Background Art

It is generally known that liquid fuel stored in a vehicle fuel tank is best kept at a relatively cool temperature. If stored fuel is exposed to heat, it may eventually percolate or cause vapor lock. Therefore, it is beneficial and advantageous to effectively isolate or shield a vehicle fuel tank from heat generated by the operation of an internal combustion engine.

One example of a reference considered to be background art to the present invention is given below.

[Patent Document 1] Japanese Laid-open Patent document No. 2006-123656

In a known saddle-type vehicle described in Japanese Laid-open Patent document 2006-123656, electric components are disposed inside a vehicle body frame, and an electric wiring harness, extending in a longitudinal direction of the vehicle, is routed inside of the vehicle body frame. Each wire is routed individually through the wiring harness of this reference, so that each individual wire has a unique wiring route.

If the electric wiring harness is routed inside of the vehicle body frame, however, the amount of space available for placing other components is restricted by the space consumed by the wiring. In addition, routing the wiring harness inside of the vehicle body frame allows for a limited amount of space in which to do wiring work, and may render it difficult to reach some of the individual wires.

Although the known heat shields and wire-holding structures have some utility for their intended purposes, a need still exists in the art for an improved heat shield and wire-holding structure. In particular, there is a need for a combined heat shield and wire-holding structure which will improve over the known wire-holding structures.

SUMMARY OF THE INVENTION

The present invention has been made under the foregoing circumstances, and it is an object of the present invention to provide a wire-holding structure for a saddle-type vehicle which allows for a larger space for housing the wiring harness, while not limiting the space available for other components.

It is another object of the invention to provide a combined heat shield and wire-holding structure.

To achieve the foregoing objects, according to a first aspect and feature of the present invention, a combined heat shield and wire-holding structure for a saddle-type vehicle is provided, where the saddle-type vehicle includes a pair of right and left vehicle body frame sections extending in a vehicle longitudinal direction, and a fuel tank disposed above the vehicle body frame sections. The heat shield/wire-holding structure includes a heat shield disposed below the fuel tank and extending between the right and left body frame sections, and also includes a wire-holding portion extending in the vehicle longitudinal direction and disposed at a position outside of the vehicle body frame. The wire-holding portion holds a wiring harness routed through an inside portion of the vehicle, specifically between the vehicle body frame and the vehicle body cover. As such, the wiring harness can be routed and held outside the vehicle body frame, thereby freeing up space within the frame, which might otherwise be used to hold the harness.

The above arrangement allows the wiring harness to be routed and held in place outside the vehicle body frame, which eliminates the need for making space available for routing the wiring harness inside of the vehicle body frame. As a result, a space for placing other parts inside of the vehicle body frame is not restricted. In addition, the wiring harness can be routed outside of the vehicle body frame. This contributes to easier wiring work during vehicle maintenance or repair, as compared to when the wiring harness is routed inside of the vehicle body frame. Further, wires of various sorts can be grouped together for wiring, which makes the wiring work easier. Additionally, the wiring harness and related parts can be protected without a high risk of being caught in the frame section. Moreover, the heat shield and the wire-holding member can be combined, leading to a reduced number of parts used.

According to a second aspect and feature of the present invention, in addition to the first aspect and feature of the present invention, a vehicle body cover covers an outside of the vehicle body frame wherein the wire-holding portion is disposed between the vehicle body frame and the vehicle body cover. As such, a space between the vehicle body frame and the vehicle body cover can be effectively used for the wire-holding portion.

According to the above aspect and feature of the present invention, a space for wiring can therefore be effectively made available by using the space between the vehicle body frame and the vehicle body cover. Further, the arrangements eliminate the likelihood of the wiring harness being caught between the vehicle body frame and the heat shield and the need for providing any other wire-holding members.

According to a third feature and aspect of the present invention, in addition to the first and second aspects and features of the present invention, the wire-holding portion includes a protrusion for holding the wiring harness and the protrusion, while holding the wiring harness from above, includes an upper portion for holding another harness or other individual wires. As such, the wire-holding portion can hold cables to be routed longitudinally in addition to the wiring harness.

According to the above aspect and feature of the present invention, the wire-holding portion is available to hold any cables to be routed longitudinally along the vehicle body in addition to the wiring harness, making for even easier wiring work.

According to a fourth aspect and feature of the present invention, in addition to any of the first through third aspects and features of the present invention, the wire-holding portion is formed to have a substantially U-shaped cross section opening upwardly, thereby supporting the wiring harness which is routed in the vehicle longitudinal direction from an underside. As such, the weight of the wiring harness can be effectively supported with the heat shield which is mounted so as to straddle across the vehicle body frame sections.

According to the above aspect and feature of the present invention, the weight of the wiring harness can therefore be effectively supported when the heat shield is mounted so as to straddle across the vehicle body frame sections. The wiring harness can therefore be held in place even more reliably.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF AN EXEMPLARY EMBODIMENT

An exemplary embodiment of the present invention will now be described, with reference to the drawings. Throughout this description, relative terms like "longitudinal," "crosswise," "vertical," and the like are used in reference to a vantage point of an operator of the vehicle, seated on the driver's seat and facing forward. It should be understood that these terms are used for purposes of illustration, and are not intended to limit the invention.

Figure 1:
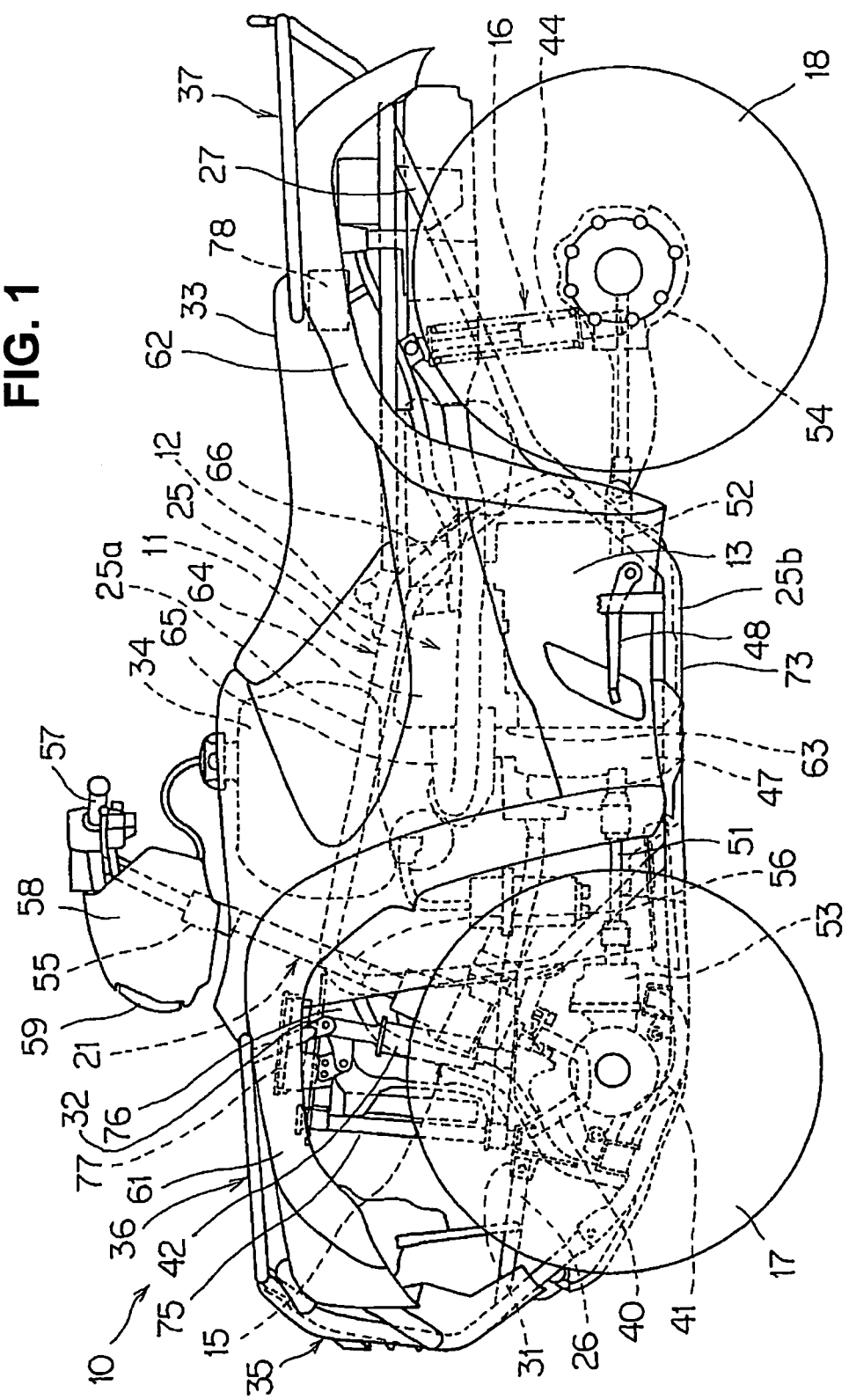
FIG. 1 is a side plan view showing a saddle-riding type off-road vehicle according to an exemplary embodiment of the present invention.

As shown in FIG. 1, a saddle-type off-road vehicle 10 (hereinafter referred to, simply, as "saddle-type vehicle 10") includes a vehicle body frame 11, an engine 12, a transmission 13, a front suspension 15, a rear suspension 16, and a steering system 21. Specifically, the engine 12 is mounted at a center lower portion of the vehicle body frame 11. The transmission 13 is connected to the engine 12 and mounted on the vehicle body frame 11. The front suspension 15 and the rear suspension 16 suspend left and right front wheels 17, 17 and left and right rear wheels 18, 18, respectively. The steering system 21 is connected to the front wheels 17, 17 and mounted on the vehicle body frame 11.

The vehicle body frame 11 includes a main frame 25, a front frame section 26, a rear frame section 27, a bracket 31, and a cross member 32. Specifically, the front frame section 26 and the rear frame section 27 are mounted at the front and rear of the main frame 25, respectively. The bracket 31 is mounted across the front frame section 26 at a lower portion thereof. The cross member 32 is mounted across the front frame section 26 at an upper portion thereof. The saddle-type vehicle 10 also includes a seat 33 mounted on the main frame 25, a fuel tank 34, a front guard 35 mounted on the front frame section 26, a front carrier 36 mounted on the front frame section 26, and a rear carrier 37 mounted at a rear portion of the main frame 25.

The front suspension 15 is an independent suspension for the left and right wheels. The front suspension 15 includes a pair of left and right front upper arms 40, 40, a pair of left and right front lower arms 41, 41, and a pair of front shock absorbers 42,4 2. The front upper arms 40, 40 and the front lower arms 41, 41 are mounted so as to be reciprocally pivotally movable on the vehicle body frame 11. The front shock absorbers 42, 42 are mounted across the front upper arms 40, 40 and the cross member 32. The rear suspension 16 includes a rear shock absorber 44 mounted on the vehicle body frame 11.

The transmission 13 includes a transmission 47, a gear change pedal 48, a front drive shaft 51, a rear drive shaft 52, a front final reduction gear 53, and a rear final reduction gear 54. Specifically, the transmission 47 is connected to an output shaft of the engine 12. The front drive shaft 51 and the rear drive shaft 52 are connected to the front and rear of the transmission 47, respectively. The front final reduction gear 53 is connected to the front drive shaft 51 and mounted on a side of the vehicle body frame 11. The rear final reduction gear 54 is connected to the rear drive shaft 52.

The steering system 21 includes a steering shaft 56 and a handlebar 57. Specifically, the steering shaft 56 is mounted at a front upper portion of the main frame 25 with a shaft holder 55. The handlebar 57 is attached to the steering shaft 56. In addition, a headlight 59 for illuminating the area in front of the vehicle body is mounted forward of the handlebar 57. The headlight 59 is covered in a headlight cover 58. The vehicle body frame 11 also includes a front fender 61 covering an area upward of the front wheels 17, 17, and a rear fender 62 covering an area upward of the rear wheels 18, 18.

The engine 12 is a four-cycle engine, including a cylinder block 63, a cylinder head 64, an exhaust system 65, and a throttle body 66. The cylinder head 64 is mounted on an upper portion of the cylinder block 63. The exhaust system 65 is connected to a front portion of the cylinder head 64. The throttle body 66 is mounted at a rear portion of the cylinder head 64. A valve actuating mechanism, a piston inserted movably in the cylinder block 63, and a crankshaft connected to the piston via a connecting rod are housed in the cylinder head 64. Additionally, an underguard 73 covering substantially the entire underside of the vehicle body is disposed under the engine 12.

A radiator 75 for cooling the engine 12 is disposed forward of the steering shaft 56. A frame section 76 extending forwardly of the steering shaft 56 supports the radiator 75. An electronic control unit 77 (ECU) is mounted on the frame section 76 at a position rearward and upward of the radiator 75. In addition, a battery 78 is mounted at a rear portion of the vehicle body. The ECU 77 and the battery 78 are connected together by a wiring harness 94, to be described later. Power is thereby supplied to the ECU 77.

Figure 2:
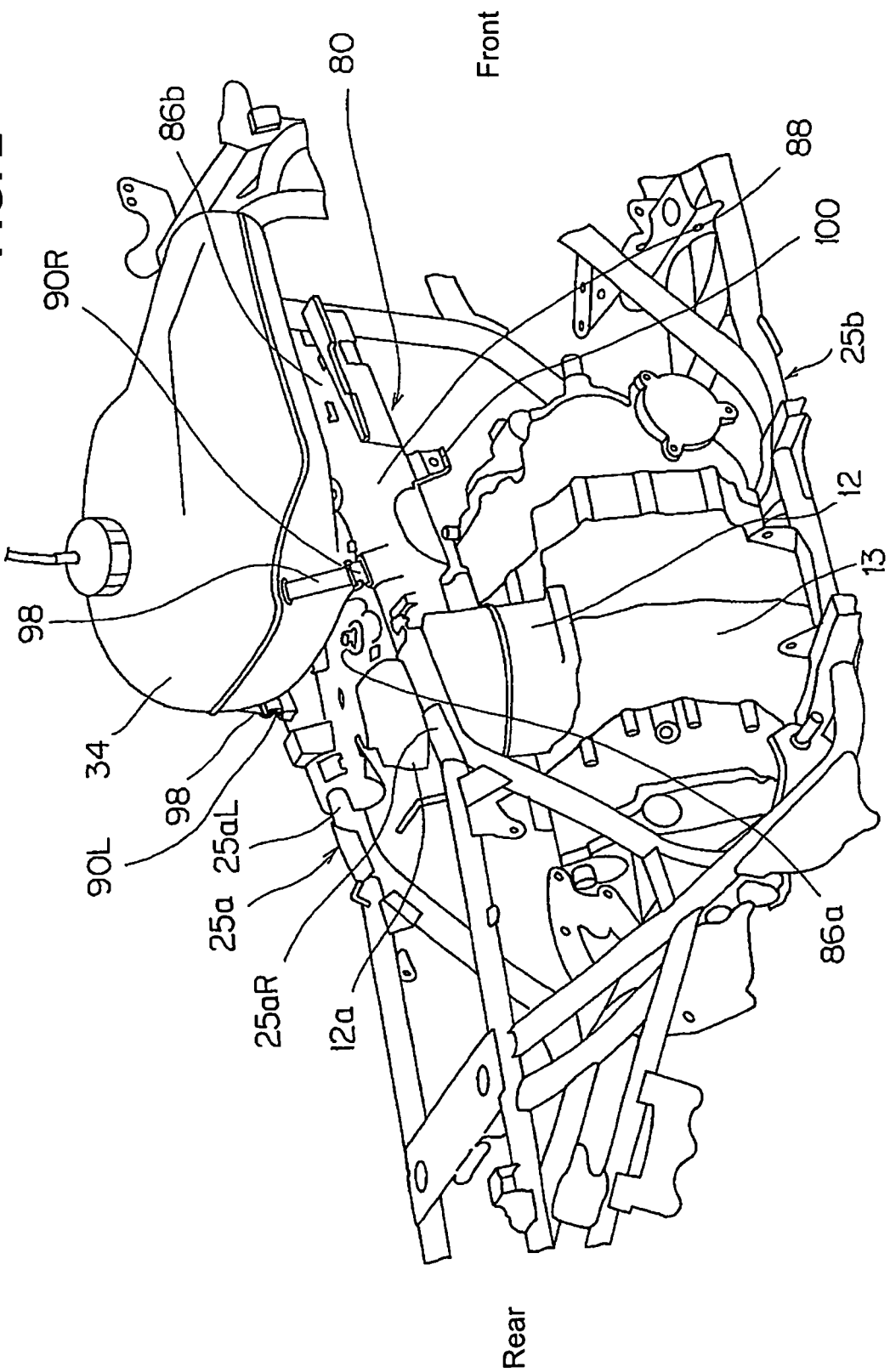
FIG. 2 is a perspective view showing the arrangement of a combined heat shield and harness routing structure according to an exemplary embodiment of the present invention, in relation to a frame section of the vehicle.

FIG. 2 is a perspective view showing the arrangement of a combined heat shield and wire-holding structure 80 (heat shield/routing structure 80), from a vantage point looking from an obliquely right rear direction and with the vehicle body cover omitted from the drawing for illustrative purposes. For reference, the front of the vehicle body would be located on the right side of the structure shown in FIG. 2.

The main frame 25 of the vehicle body frame 11 includes a pair of left and right upper frame sections 25a and lower frame sections 25b extending in the longitudinal direction of the vehicle body. The engine 12 and the transmission 13 are disposed inside a space surrounded by the upper frame sections 25a and the lower frame sections 25b. In contrast, the fuel tank 34 is disposed between the upper frame sections 25a in a width direction of the vehicle, and is located upwardly above the upper frame sections 25a in a vertical direction, as shown. Further, the fuel tank 34 is disposed at a position obliquely upwardly and toward the front of the vehicle, relative to the position of the engine 12. If the structure shown in FIG. 2 were shown in a top plan view thereof, a rear portion of the fuel tank 34 would overlap a front end portion of the transmission 13.

Arrangements need to be made to substantially prevent or minimize any transfer of heat from the engine 12 and transmission 13 to the fuel tank 34. To achieve that purpose, the heat shield portion of the heat shield/routing structure 80 according to the present invention is interposed between the engine 12 and the fuel tank 34, so as to cover the entire surface of the above-referenced overlapping portion in the plan view. The heat shield/routing structure 80 extends in the vehicle longitudinal direction along and between the upper frame sections 25a, as shown. The heat shield/routing structure 80 effectively shields the fuel tank 34 from heat of the engine 12, and substantially prevents such heat from being transmitted to the fuel tank 34.

Figure 3:
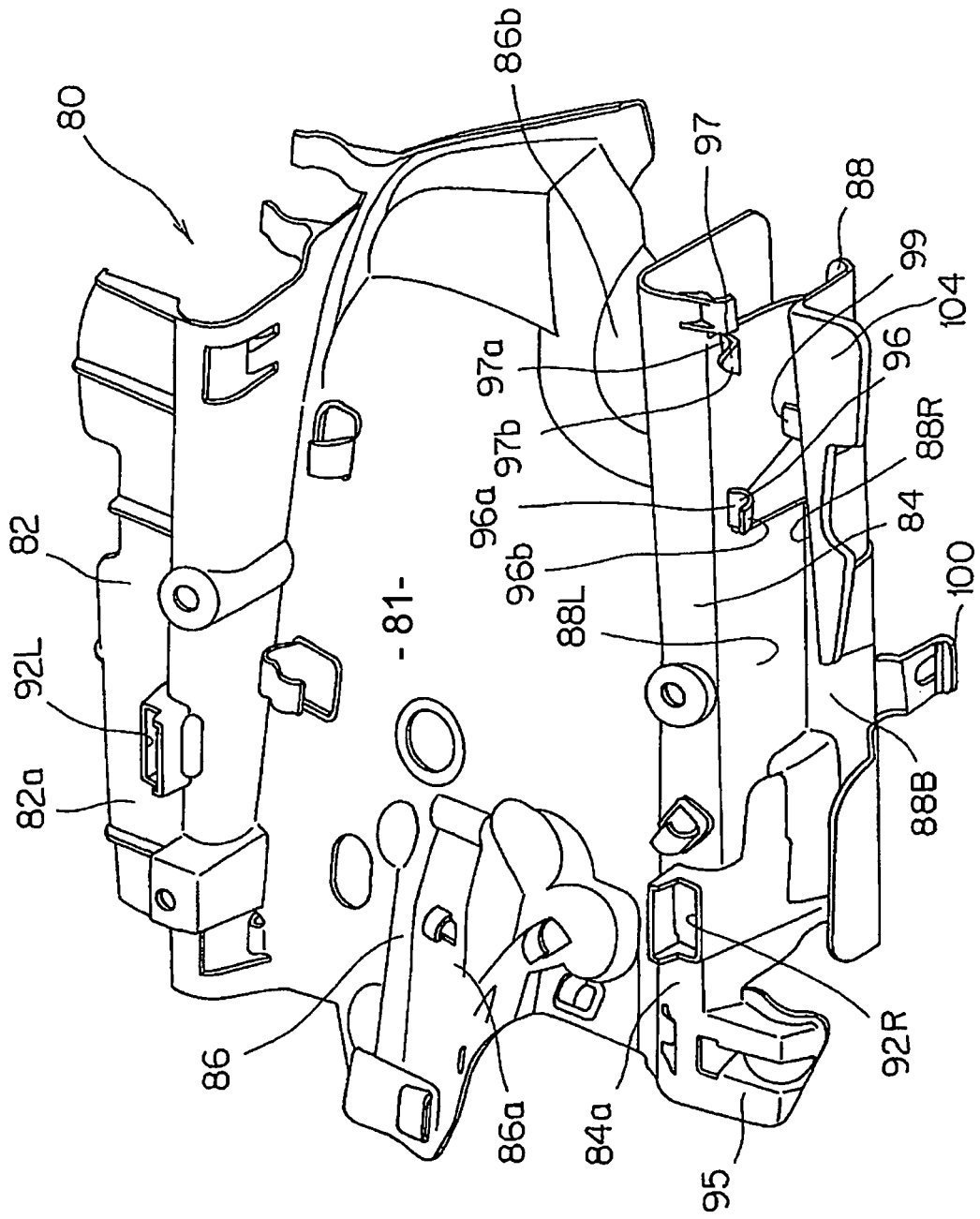
FIG. 3 is a perspective view showing the combined heat shield and harness routing structure hereof as viewed from a front right direction.

FIG. 3 is a perspective view showing the heat shield/routing structure 80 as viewed from an obliquely front right corner direction thereof.

As shown in FIG. 3, the heat shield/routing structure 80 includes a base plate 81 having a generally flat shape. The heat shield/routing structure 80 also includes a left hook portion 82, a right hook portion 84, a heat-shielding portion 86, and a wire-holding portion 88 integrated therewith.

Specifically, the left hook portion 82 is mounted so as to cover an upper left frame section 25aL disposed on the left side of the upper frame section 25a. The right hook portion 84 is mounted so as to cover a right frame section 25aR disposed on the right side of the upper frame section 25a. The heat-shielding portion 86 is interposed between the engine 12 and the fuel tank 34. The wire-holding portion 88 is disposed on the right side of the right hook portion 84. The left hook portion 82 is substantially L-shaped (with an inverted L-shape) as viewed in a vertical cross section taken along a vehicle width direction.

Figure 4:
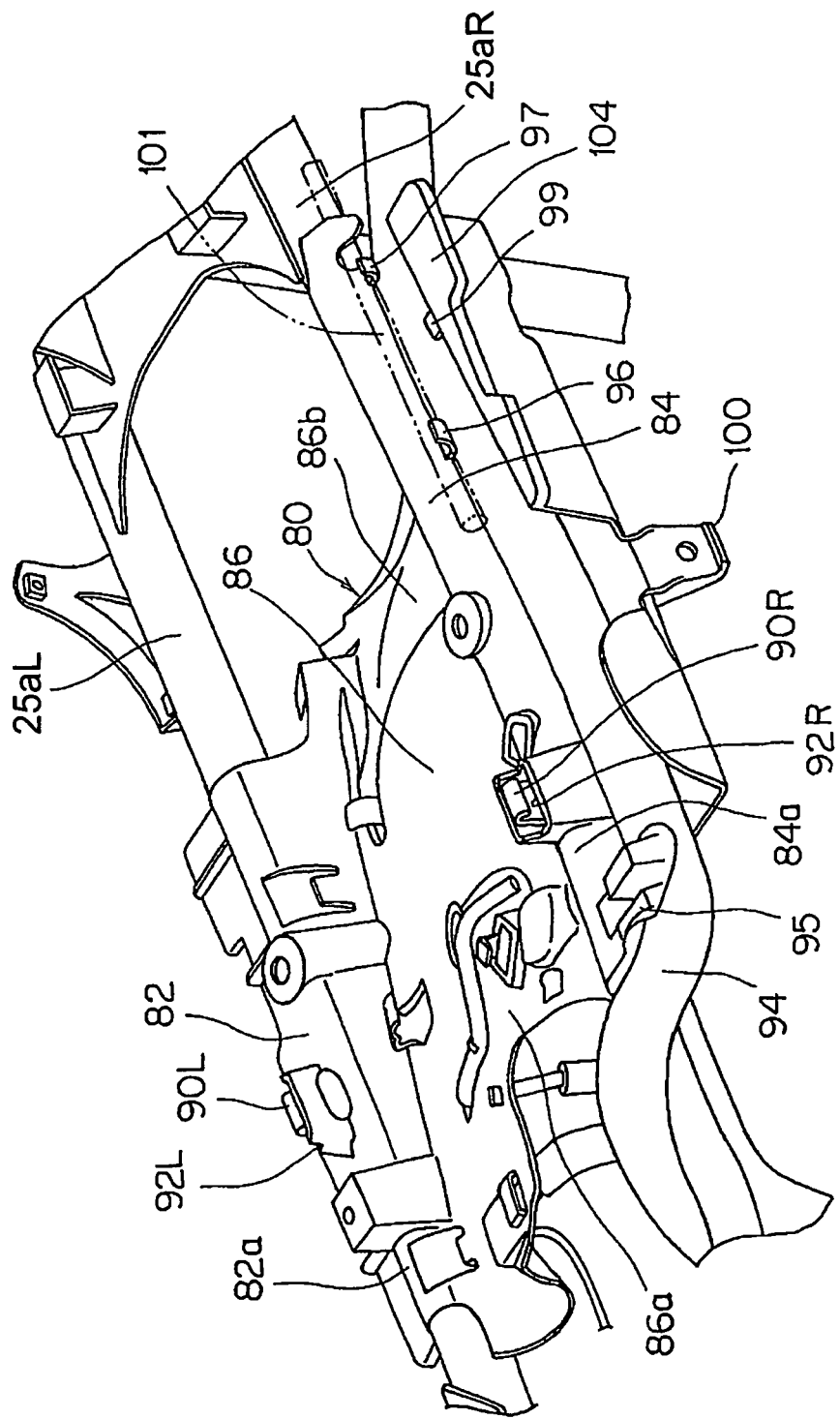
FIG. 4 is a perspective view showing the wiring harness as supported by the combined heat shield and harness routing structure hereof, with a portion of the heat shield omitted for illustrative purposes.

FIG. 4 is a perspective view showing the wiring harness as supported by the combined heat shield and harness routing structure hereof, with a portion of the heat shield omitted for illustrative purposes. As shown in FIG. 4, the left hook portion 82 is mounted so as to cover an inner side and an upper side of the upper left frame section 25aL. In addition, a fuel tank mounting portion 90L, that protrudes above the vehicle body frame, is disposed on an upper surface of the upper left frame section 25aL. An upper surface 82a of the left hook portion 82 has a through hole 92L formed therein. The fuel tank mounting portion 90L is passed through the through hole 92L.

The right hook portion 84 is substantially L-shaped (with an inverted L-shape) as viewed in a vertical cross section taken along a vehicle width direction. As shown in FIG. 4, the right hook portion 84 is mounted so as to cover an inner side, an outer side, and an upper side of the upper right frame section 25aR. In addition, a fuel tank mounting portion 90R that protrudes above the vehicle body frame is disposed on an upper surface of the upper right frame section 25aR, in a manner similar to the upper left frame section 25aL. An upper surface 84a of the right hook portion 84 has a through hole 92R formed therein. The fuel tank mounting portion 90R is passed through the through hole 92R.

The left hook portion 82 and the right hook portion 84 extend longitudinally along the vehicle body. Each of the left hook portion 82 and the right hook portion 84 is formed to fit a slightly curved shape of the upper left frame section 25aL and the upper right frame section 25aR, respectively, with the heat shield/routing structure 80 mounted on the upper frame sections 25aR, 25aL. The left hook portion 82 and the right hook portion 84 are spaced apart from each other in the vehicle width direction to coincide with the spacing between the upper left frame section 25aL and the upper right frame section 25aR. The left hook portion 82 and the right hook portion 84 are mounted so as to cover the upper left and right frame sections 25aL, 25aR, respectively. This places the heat shield/routing structure 80 on the upper frame sections 25a so as to straddle across, and extend between the upper frame sections 25a.

This results in the crosswise mounting position of the heat shield/routing structure 80 being determined by the crosswise positions of the left hook portion 82 and the right hook portion 84, and the longitudinal mounting position of the heat shield/routing structure 80 being determined by the fuel tank mounting portions 90L, 90R being passed through the through holes 92L, 92R.

Further, the heat shield/routing structure 80 is mounted, as a single unit, so as to be placed on the upper frame sections 25a. The heat shield/routing structure 80 is configured to be fixed in place with, for example, a bolt when other parts are attached to the upper frame sections 25a.

Elastic bands 98 (see FIG. 2) extending, respectively, from left and right rear portions of the fuel tank 34 are attached to leading ends of the fuel tank mounting portions 90L, 90R and are passed through the through holes 92L, 92R. Further, the fuel tank 34 is mounted on the main frame 25 by a front portion thereof being fixed in place with a mounting bolt (not shown).

The heat-shielding portion 86 is formed into a substantially flat shape, such that lower ends of inner faces of the left hook portion 82 and the right hook portion 84 are connected with each other by the heat-shielding portion 86. Further, the heat-shielding portion 86 is formed to be inclined downwardly toward the front to fit the shape of a bottom surface of the fuel tank 34. A rearward portion 86a of the heat shielding portion 86 is undulated, as shown in FIG. 2, to follow the shape of an upper portion of a cylinder cover 12a of the engine 12, thereby preventing interference with the cylinder cover 12a. Additionally, the heat-shielding portion 86 has a forward portion 86b dented downwardly to accommodate a fuel pump (not shown) protruding from a bottom portion of the fuel tank 34.

Figure 5:
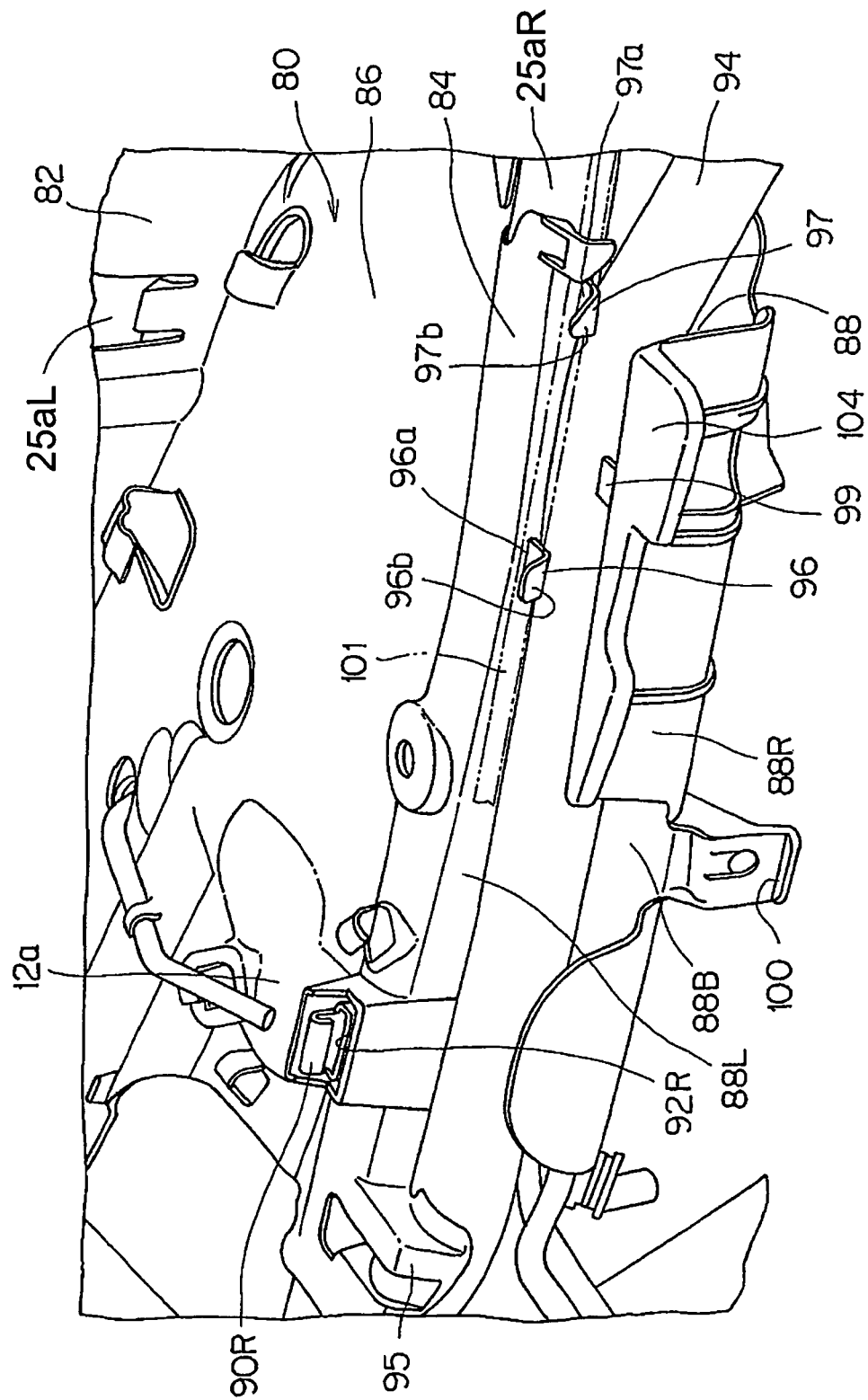
FIG. 5 is a perspective view showing a wire-holding portion of the combined heat shield and harness routing structure hereof.

Referring once again to FIG. 3, the wire-holding portion 88 includes a left side wall portion 88L, a right side wall portion 88R, and a bottom or floor portion 88B cooperating to define a wire-receiving channel therein. The wire-holding portion 88 has a substantially U-shaped cross section. In addition, the wire-holding portion 88 extends longitudinally along the vehicle body, and is formed to have a length which is approximately equal to the length of the right hook portion 84. The wiring harness 94 routed in the vehicle longitudinal direction is supported in a direction in which the wiring harness 94 extends on the inside of the U-shape of the wire-holding portion 88 as shown in FIG. 4. The left side wall portion 88L of the wire-holding portion 88 serves also as a wall that constitutes an outside part of the right hook portion 84. As shown in FIGS. 3 and 5 of the drawings, the floor portion 88B of the wire-holding portion 88 is situated at a level which is substantially aligned with the base plate 81 of the heat shield 80.

The wiring harness 94 includes a duct-like hollow tube through which wires of various sorts are grouped together and routed. The wires of various sorts include, for example, power drive wires connecting the battery 78 and the ECU 77, wires of a sensor system, and power source wires connected to lights of various kinds. The wires connect the front of the vehicle to the rear of the vehicle, including wires routed on the right side of the vehicle.

FIG. 5 is an enlarged detail perspective view of the wire-holding portion 88 shown in FIG. 4. The left side wall portion 88L has three spaced-apart harness support portions 95, 96, 97 formed thereon. The wiring harness support portions 95, 96, 97 extend outside of the vehicle body frame (inside the wire-holding portion 88). The wiring harness support portions 95, 96, 97 are disposed at a trailing end portion, an intermediate portion relatively near a leading end portion, and a leading end portion, respectively, of the wire-holding portion 88 in an extending direction thereof, each being spaced apart from the others. The wiring harness support portions 95, 96, 97 support an upper side of the wiring harness 94, to keep the harness in the wire-receiving channel and to prevent the harness 94 from moving upwardly past an upper open portion of the wire-holding portion 88. In addition, the wiring harness 94 has a left side restricted by the left side wall portion 88L, a right side restricted by the right side wall portion 88R, and a lower side restricted by the bottom portion 88B.

The wiring harness support portions 96, 97 include, more specifically, horizontal portions 96a, 97a and fold-back portions 96b, 97b, respectively. The horizontal portions 96a, 97a extend from the left side wall portion 88L toward the outside of the vehicle body frame. The fold-back portions 96b, 97b extend upwardly from leading ends of the horizontal portions 96a, 97a. A throttle cable 101 (shown in phantom in FIG. 5) may also be routed on the horizontal portions 96a, 97a.

Specifically, the horizontal portions 96a, 97a restrict a lower side of the throttle cable 101, while restricting (supporting) an upper side of the above-referenced wiring harness 94. Further, the fold-back portions 96b, 97b restrict the right side position of the throttle cable 101. The above-described left side wall portion 88L restricts the position of the left side of the throttle cable 101.

The right side wall portion 88R, on the other hand, includes a wiring harness retaining tab 99 formed thereon. The wiring harness retaining tab 99 extends inwardly toward the inside of the vehicle body (inside the wire-holding portion 88) to support the upper side of the wiring harness 94. The wiring harness retaining tab 99 is disposed at the leading end in the direction in which the wire-holding portion 88 extends and between the wiring harness support portions 96, 97.

The bottom portion 88B of the wire-holding portion 88 further includes a vehicle body cover-mounting portion 100 (cover-mounting portion 100) formed thereon. Extending below the vehicle body cover, the cover-mounting portion 100 has a mounting surface formed to be substantially flush with the side wall face of the right side wall portion 88R.

In addition, the right side wall portion 88R includes a vehicle body cover receiver 104 disposed at an upper end thereof. The vehicle body cover receiver 104 extends outside of the vehicle body frame 11.

Figure 6:
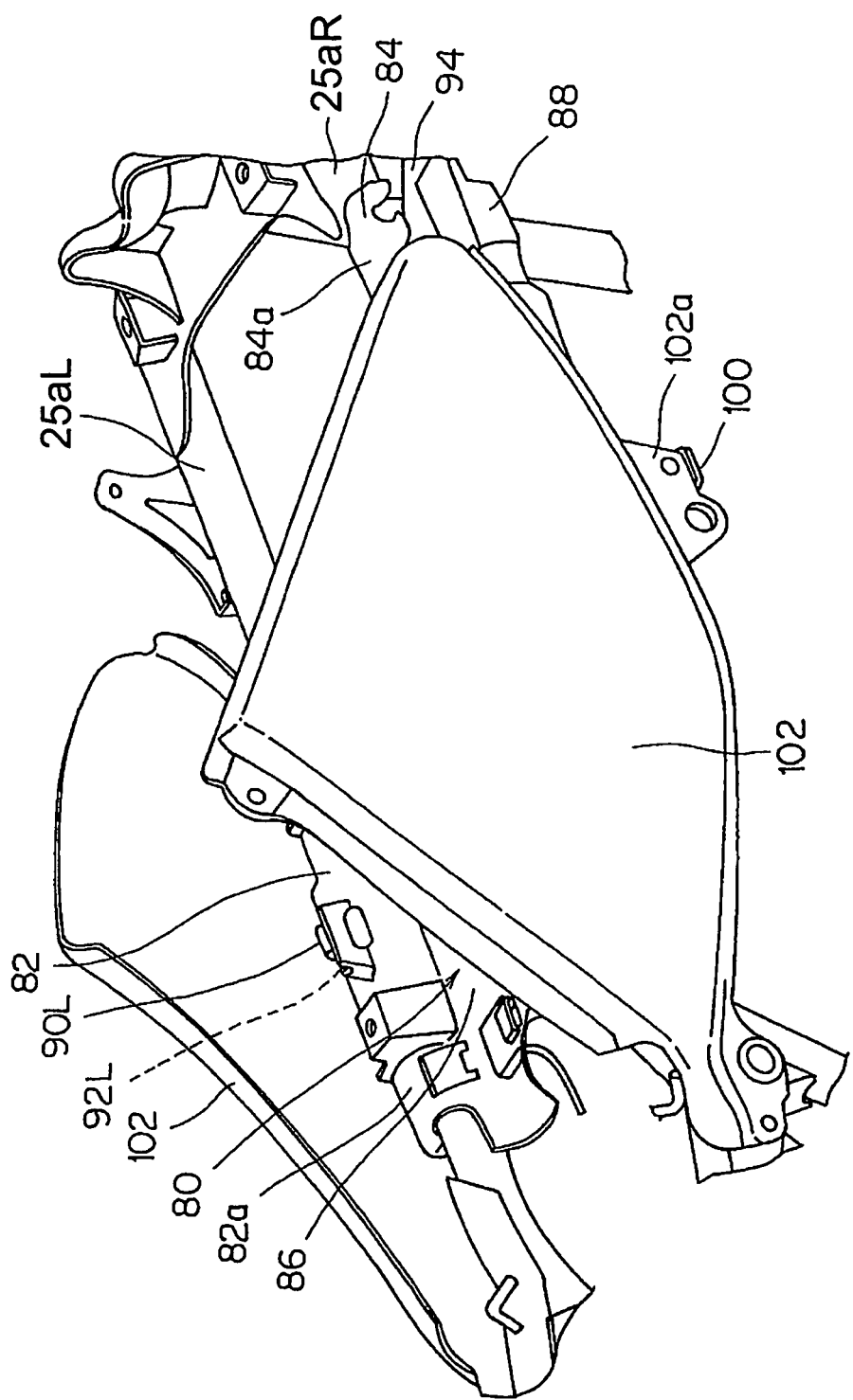
FIG. 6 is a perspective view showing a vehicle body cover mounted on the wiring harness, which is supported by the combined heat shield and harness routing structure.

FIG. 6 is a perspective view showing a condition in which a portion of a vehicle body cover 102 is mounted on both sides of the vehicle body shown in FIG. 4.

As seen in a side view, the vehicle body cover 102 is shaped substantially like a modified rhombus with sides of unequal length. While hiding the inside of the vehicle, the vehicle body cover 102 forms a curved surface on the outside to improve appearance of the vehicle. The vehicle body cover 102 also offers a portion of knee grip for a rider during operation of the vehicle. A portion near a lower corner 102a of the vehicle body cover 102 is attached to the above-described cover-mounting portion 100 with a bolt (not shown).

As such, with the vehicle body cover 102 mounted in place, the wire-holding portion 88 and the vehicle body cover receiver 104 are disposed between the upper right frame section 25aR of the vehicle body frame 11 and the vehicle body cover 102. When the vehicle body cover 102 is flexed by a knee grip force applied by the rider to the vehicle body cover 102, therefore, the wire-holding portion 88 and the vehicle body cover receiver 104 receive the force. As a result, the vehicle body cover 102 can be prevented from being largely flexed in the vehicle width direction, ensuring good holding feeling during gripping thereof by a user's knees.

In accordance with the saddle-type vehicle according to the exemplary embodiment of the present invention, the heat shield/routing structure 80 is disposed to straddle across and extend between the upper left frame section 25aL and the upper right frame section 25aR under the fuel tank 34. The wire-holding portion 88 extends in the longitudinal direction of the vehicle, alongside the heat shield/routing structure 80 and on the outside of the upper right frame section 25aR.

The wire-holding portion 88 is integrally formed with the heat-shielding portion 86, for holding the wiring harness 94 routed inside the vehicle body cover 102. This allows the wiring harness 94 to be routed and held on the outside of the upper right frame section 25aR, eliminating the need for making available a space for routing the wiring harness 94 on the inside of the vehicle body frame 11. As a result, a space for placing other parts inside the vehicle body frame 11 is not restricted. In addition, the wiring harness 94 can be routed on the outside of the upper right frame section 25aR. This contributes to easier wiring work as compared to when the wiring harness is routed inside of the vehicle body. Further, wires of various sorts can be grouped together for wiring, which makes the wiring work easier.

The vehicle body cover 102 covers the outside of the vehicle body proximate the wire-holding portion 88, and the wire-holding portion 88 is disposed between the upper right frame section 25aR and the vehicle body cover 102. A space for wiring can therefore be effectively made available by using the space between the upper right frame section 25aR and the vehicle body cover 102.

Additionally, the wire-holding portion 88 includes the wiring harness support portions 96, 97 supporting the wiring harness 94; while the horizontal portions 96a, 97a of the wiring harness support portions 96, 97 are used to hold the wiring harness 94, the fold-back portions 96b, 97b are formed on the wiring harness support portions 96, 97 to hold the throttle cable 99 on the upper portion of the wiring harness support portions 96, 97. This allows the wire-holding portion 88 to hold any cables to be routed longitudinally along the vehicle body in addition to the wiring harness 94, making for even easier wiring work.

In addition, the wire-holding portion 88 is formed to have a substantially U-shaped cross section opening upwardly, thereby supporting the wiring harness 94 routed in the vehicle longitudinal direction from the underside. The weight of the wiring harness 94 can therefore be effectively supported with the heat shield/routing structure 80 mounted so as to straddle across the upper left frame section 25aL and the upper right frame section 25aR. The wiring harness 94 can therefore be held in place even more reliably.

Moreover, the mounting position of the heat shield/routing structure 80 in the crosswise direction is determined by the crosswise positions of the left hook portion 82 and the right hook portion 84, while the mounting position of the heat shield/routing structure 80 in the longitudinal direction is determined by the fuel tank mounting portions 90L, 90R being passed through the through holes 92L, 92R. The heat shield/routing structure 80 can therefore be easily mounted without having to be assembled at the time of mounting.

Further, the heat shield/routing structure 80 is not fixed in place as a single unit to the vehicle body frame 11, but is to be fixed in place with, for example, a bolt when other parts are together mounted. This reduces the number of parts, for example, bolts and makes for easier mounting work.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. For example, in the exemplary embodiment of the present invention, the wire-holding portion 88 is provided on the right side of the vehicle; however, the wire-holding portion 88 may be provided on the left-hand side of the vehicle, or on both sides of the vehicle. This not only forms a wiring space effectively, but also ensures easy wiring work. All such modifications, which are within the scope of the claims, are intended to be within the scope and spirit of the present invention.

What is claimed is:

1. A saddle-seat vehicle including a vehicle body frame comprising a pair of right and left upper frame sections respectively extending in a longitudinal direction of the vehicle, and a fuel tank disposed substantially above the upper frame sections of the vehicle body frame, the improvement comprising a combined heat shield and wire-holding structure comprising:
   a heat-shielding portion interposed between the fuel tank and the vehicle body frame and bridging across the right and left frame sections, the heat-shielding portion comprising a base plate; and
   a hook portion integrally formed with the heat shielding portion, said hook portion having a substantially inverted L-shaped cross section opening downwardly, and mounted to cover a frame section from the upper frame section; and
   a wire-holding portion having a left side wall portion, a right sidewall portion, and a bottom portion, and being integrally formed with the heat-shielding portion and disposed outside of the vehicle body frame,
   wherein the wire-holding portion is disposed adjacent outside of the hook portion, and has a substantially U-shaped cross section opening upwardly,
   wherein the wire-holding portion has a wire-holding channel formed therein which extends substantially in the longitudinal direction of the vehicle and is configured and arranged to receive a wiring harness therein routed through an area of the vehicle outside of the vehicle body frame,
   wherein the wire-holding portion includes at least one first protrusion for holding the wiring harness from above disposed on a first lateral side of the wire-holding portion and at least one second protrusion disposed on a second lateral side of the wire-holding portion opposing the first lateral side,
   wherein the bottom portion of the wire-holding portion includes a vehicle body cover-mounting portion formed thereon,
   wherein the side wall portions of the wire-holding portion include an upper end and a lower end and, and the right side wall portion includes a vehicle body cover receiver disposed at the upper end thereof, and receives a vehicle body cover thereon, and
   wherein said vehicle body cover provides a portion of a knee grip for a rider during operation of the vehicle, and when the vehicle body cover is flexed by a knee grip force applied by a rider to the vehicle body cover, the wire holding portion and the vehicle body cover receiver receive the force.

2. The combined heat shield and wire-holding structure in a saddle-seat vehicle according to claim 1, wherein a portion of the vehicle body cover covers an outside portion of the vehicle body frame, such that the wire-holding portion is disposed between the vehicle body frame and the vehicle body cover.

3. The combined heat shield and wire-holding structure in a saddle-seat vehicle according to claim 1, wherein the wire-holding portion is formed to have a substantially U-shaped cross section which opens upwardly to define the wire-receiving channel for supportively receiving the wiring harness therein, routed in the longitudinal direction of the vehicle.

4. The combined heat shield and wire-holding structure in a saddle-seat vehicle according to claim 1, wherein left and right sides of the combined structure have respective first and second through holes formed therein, and further comprising:
   first and second fuel tank mounting portions respectively attached to and protruding respectively upwardly from the right and left frame sections, wherein the first and second fuel tank mounting portions pass through the first and second through holes, respectively, and
   a pair of first and second elastic bands extending between the respective fuel tank mounting portions and the fuel tank.

5. The combined heat shield and wire-holding structure in a saddle-seat vehicle according to claim 1, wherein the right and left frame sections are substantially parallel to one another.

6. The combined heat shield and wire-holding structure in a saddle-seat vehicle according to claim 1, wherein the combined heat shield and wire-holding structure comprises a base plate, a left hook portion integrally formed with the base plate for placement over the left frame section, a right hook portion integrally formed with the base plate for placement over the right frame section, and the wire-holding portion integrated with at least one of said hook portions.

7. The combined heat shield and wire-holding structure in a saddle-seat vehicle according to claim 1, wherein the at least one first protrusion includes a horizontal portion and a transverse fold-back portion for supporting at least one other wire or cable from a side thereof.

8. The combined heat shield and wire-holding structure in a saddle-seat vehicle according to claim 1, further comprising a covering protrusion disposed above the at least one first protrusion to support at least one other wire or cable from above.

9. The combined heat shield and wire-holding structure in a saddle-seat vehicle according to claim 1, wherein the wire-holding portion further comprises a bottom portion connecting the first lateral side to the second lateral side to form substantially U-shaped channel, and wherein the at least one first protrusion includes a plurality of first protrusions spaced apart along an upper portion of the first lateral side and wherein the at least one second protrusion is disposed along an upper portion of the second lateral side in a position between the plurality of first protrusions.

10. A saddle-seat vehicle including a vehicle body frame comprising a pair of right and left upper frame sections respectively extending in a longitudinal direction of the vehicle, and a fuel tank disposed substantially above the upper frame sections of the vehicle body frame, the improvement comprising a combined heat shield and wire-holding structure, comprising:

a base plate comprising a heat-shielding portion, said base plate being interposed between the fuel tank and the vehicle body frame and bridging across the right and left frame sections;

a left hook portion integrally formed with the base plate for placement over the left frame section, and a right hook portion integrally formed with the base plate for placement over the right frame section, wherein the right hook portion is integrally formed with the heat shielding portion, and mounted to cover a right frame section from the upper frame side, and wherein the left and right hook portions each have a substantially inverted L-shaped cross section opening downwardly, and a wire-holding portion having a left side wall portion, a right sidewall portion, and a bottom portion, and being integrally formed with the heat-shielding portion and disposed outside of the vehicle body frame, wherein said wire-holding portion is disposed adjacent outside of the hook portion, and has a substantially U-shaped cross section opening upwardly, wherein the wire-holding portion has a wire-holding channel formed therein which extends substantially in the longitudinal direction of the vehicle and is configured and arranged to receive a wiring harness therein routed through an area of the vehicle outside of the vehicle body frame, the wire-holding portion being integrated with at least one of said hook portions, and wherein the wire-holding portion includes at least one first protrusion for holding the wiring harness from above disposed on a first lateral side of the wire-holding portion and at least one second protrusion for holding the wiring harness from above disposed on a second lateral side of the wire-holding portion opposing the first lateral side, wherein the bottom portion of the wire-holding portion includes a vehicle body cover-mounting portion formed thereon, wherein the side wall portions of the wire-holding portion include an upper end and a lower end and, and the right side wall portion includes a vehicle body cover receiver disposed at the upper end thereof, and receives a vehicle body cover thereon, and wherein said vehicle body cover provides a portion of a knee grip for a rider during operation of the vehicle, and when the vehicle body cover is flexed by a knee grip force applied by a rider to the vehicle body cover, the wire holding portion and the vehicle body cover receiver receive the force.

11. The combined heat shield and wire-holding structure in a saddle-seat vehicle according to claim 10, wherein a portion of the vehicle body cover covers an outside portion of the vehicle body frame, such that the wire-holding portion is disposed between the vehicle body frame and the vehicle body cover.

12. The combined heat shield and wire-holding structure in a saddle-seat vehicle according to claim 10, wherein the wire-holding portion is formed to have a substantially U-shaped cross section which opens upwardly to define the wire-receiving channel for supportively receiving the wiring harness therein, routed in the longitudinal direction of the vehicle.

13. The combined heat shield and wire-holding structure in a saddle-seat vehicle according to claim 10, wherein an upper surface of the right hook portion has a first through hole formed therein, wherein an upper surface of the left hook portion has a second through hole formed therein, and further comprising:

first and second fuel tank mounting portions respectively attached to and protruding respectively upwardly from the left and right frame sections, wherein the first and second fuel tank mounting portions pass through the first and second through holes, respectively, and a pair of first and second elastic bands extending between the respective fuel tank mounting portions and the fuel tank.

14. A saddle-seat vehicle including:

a vehicle body cover;

a vehicle body frame which includes a pair of left and right upper frame sections and a pair of left and right lower frame sections, wherein the vehicle body frame extends in a longitudinal direction of the vehicle body;

an engine and a transmission, wherein said engine and transmission are disposed inside a space surrounded by said left and right upper frame sections and said left and right lower frame sections;

a fuel tank, wherein said fuel tank is disposed between said left and right upper frame sections in a width direction of said left and right upper frame sections and substantially above said left and right upper frame sections;

a heat shield which extends in the longitudinal direction of the vehicle along said left and right upper frame sections, said heat shield disposed between said engine and said transmission and below said fuel tank, said heat shield including a base plate and a wire-holding portion having a left side wall portion, a right sidewall portion, and a bottom portion, and extending in the longitudinal direction of the vehicle and disposed outside of the vehicle body frame, wherein the wire-holding portion is disposed adjacent outside of a hook portion and the wire-holding portion is formed to have a substantially U-shaped cross section extending upwardly, a hook portion integrally formed with the heat shielding portion, said hook portion having a substantially inverted L shaped cross section opening downwardly, and mounted to cover a frame section from the upper frame section; and wherein said vehicle body cover covers an outside of the vehicle body frame such that the wire-holding portion is disposed between the vehicle body frame and the vehicle body cover, and wherein the wire-holding portion includes at least one first protrusion for holding the wiring harness from above disposed on a first lateral side of the wire-holding portion and at least one second protrusion for holding the wiring harness from above disposed on a second lateral side of the wire-holding portion opposing the first lateral side, wherein the bottom portion of the wire-holding portion includes a vehicle body cover-mounting portion formed thereon, wherein the side wall portions of the wire-holding portion include an upper end and a lower end and, and the right side wall portion includes a vehicle body cover receiver disposed at the upper end thereof, and receives a vehicle body cover thereon, and wherein said vehicle body cover provides a portion of a knee grip for a rider during operation of the vehicle, and when the vehicle body cover is flexed by a knee grip force applied by a rider to the vehicle body cover, the wire holding portion and the vehicle body cover receiver receive the force.

15. The saddle-seat vehicle according to claim 14, wherein a portion of a vehicle body cover covers an outside portion of the vehicle body frame, such that the wire-holding portion is disposed between the vehicle body frame and the vehicle body cover.

16. The saddle-seat vehicle according to claim 14, wherein the wire-holding portion is formed to have a substantially U-shaped cross section which opens upwardly to define the wire-receiving channel for supportively receiving the wiring harness therein, routed in the longitudinal direction of the vehicle.

17. The saddle-seat vehicle according to claim 14, wherein the right and left frame sections are substantially parallel to one another.

18. The saddle-seat vehicle according to claim 14, wherein the combined heat shield and wire-holding structure comprises a base plate, a left hook portion integrally formed with the base plate for placement over the left frame section, a right hook portion integrally formed with the base plate for placement over the right frame section, and the wire-holding portion integrated with at least one of said hook portions.

19. The saddle-seat vehicle according to claim 18, wherein an upper surface of the right hook portion has a first through hole formed therein, wherein an upper surface of the left hook portion has a second through hole formed therein, and further comprising:

first and second fuel tank mounting portions respectively attached to and protruding respectively upwardly from the left and right frame sections, wherein the first and second fuel tank mounting portions pass through the first and second through holes, respectively, and a pair of first and second elastic bands extending between the respective fuel tank mounting portions and the fuel tank.

20. The saddle-seat vehicle according to claim 14, wherein left and right sides of the combined structure have respective through holes formed therein, and further comprising:

first and second fuel tank mounting portions respectively attached to and protruding respectively upwardly from the right and left frame sections, wherein the first and second fuel tank mounting portions pass through the first and second through holes, respectively, and a pair of first and second elastic bands extending between the respective fuel tank mounting portions and the fuel tank.

* * * * *